United States Patent [19]

Nagano

[11] Patent Number: 4,597,474
[45] Date of Patent: Jul. 1, 1986

[54] BRAKE FOR A BICYCLE

[75] Inventor: Masashi Nagano, Izumi, Japan

[73] Assignee: Shimano Industrial Company Limited, Osaka, Japan

[21] Appl. No.: 518,420

[22] Filed: Jul. 29, 1983

[30] Foreign Application Priority Data

Aug. 11, 1982 [JP] Japan ............................ 57-122399[U]
Oct. 9, 1982 [JP] Japan ............................ 57-153420[U]

[51] Int. Cl.$^4$ .............................................. B62L 3/00
[52] U.S. Cl. ................................ 188/24.21; 188/72.3; 188/72.9; 267/155
[58] Field of Search ............... 188/24.11, 24.12, 24.19, 188/24.21, 24.22, 72.9, 72.3, 216; 267/58, 155

[56] References Cited

U.S. PATENT DOCUMENTS

| 360,595 | 4/1887 | Johnson et al. ............... 188/24.11 X |
| 2,160,181 | 5/1939 | Taylor ........................... 188/24.19 |
| 2,688,481 | 9/1954 | Bergquist ......................... 267/58 |

FOREIGN PATENT DOCUMENTS

| 474267 | 4/1947 | Belgium . | |
| 843632 | 7/1952 | Fed. Rep. of Germany ...... 267/155 |
| 845015 | 12/1952 | Fed. Rep. of Germany . | |
| 945003 | 6/1949 | France . | |
| 985880 | 3/1951 | France . | |
| 1019440 | 1/1953 | France ............................ 188/24.22 |
| 1075997 | 10/1954 | France ............................ 188/24.21 |
| 1143998 | 10/1957 | France ............................ 188/24.22 |
| 1373790 | 8/1964 | France ............................ 267/155 |
| 453290 | 2/1951 | Italy ............................... 188/24.21 |
| 23092 | of 1902 | United Kingdom ............. 188/24.21 |
| 261868 | 12/1926 | United Kingdom ............. 188/24.11 |

Primary Examiner—George E. A. Halvosa
Attorney, Agent, or Firm—Stevens, Davis, Miller & Mosher

[57] ABSTRACT

A brake for a bicycle comprising a pair of mounting bases, a pair of cantilevers having brake shoes supported rotatably to the mounting bases respectively, return springs, and cylindrical members separate from the mounting bases and cantilevers which cover the springs. The cantilevers have fitting portions fitted to the cylindrical members so that the cylindrical members form spring chambers into which the springs are housed therein respectively.

4 Claims, 7 Drawing Figures

BRAKE FOR A BICYCLE

FIELD OF THE INVENTION

This invention relates to a brake for a bicycle, and more particularly to a brake for a bicycle comprising a pair of cantilevers each having a brake shoe and a pair of mounting bases for mounting the cantilevers to the bicycle frame respectively.

BACKGROUND OF THE INVENTION

Generally, the brake for a bicycle, comprising a pair of cantilevers and a pair of mounting bases through which the cantilevers are mounted to the bicycle frame, has hitherto been well-known and called the cantilever brake.

The cantilever brake is so constructed that the mounting bases are fixed to the bicycle frame, for example, the front fork, by welding or other fixing means. The cantilevers are mounted rotatably to the respective mounting bases, return springs are interposed between the cantilevers and the respective mounting bases, and a suspension wire connecting free ends of both the cantilevers is pulled at the center, so that the cantilevers are rotated against the return springs to bring brake shoes at the cantilevers into contact with the bicycle wheel rim to exert the braking action and the cantilevers being restored by the return springs to release the braking action.

The conventional cantilever brake, however, has each return spring R interposed between a mounting base M and a boss B of cantilever C and exposed to the exterior as shown in FIG. 7. In addition, in the same drawing, reference S designates a shaft mounted to the mounting base M, P designates a pin constituting a rotation restriction means to be discussed below, T designates a through bore provided at the boss B, D designates a projection constituting the rotation restriction means in cooperation with the pin P, E designates a tightening screw, and F designates a washer. Therefore, the return springs R become soiled with mud splashed, for example, by rotation of the bicycle front wheel, or they become dusty, or they get rusty, thereby creating an unsmooth operation of the cantilevers.

SUMMARY OF THE INVENTION

An object of the invention is to provide a brake for a bicycle, having a simple structure for protecting the return springs from the attachment of mud or dust, or from getting rusty by rain water, thereby always enabling a smooth operation of the cantilevers.

This invention is characterized in that a cylindrical member separate from each mounting base and cantilever, is provided to cover each return spring, and a fitting portion is formed at the boss of each cantilever and fitted into the cylindrical member to thereby form a sealed spring chamber, so that each return spring is housed therein and protected from rain water, mud or dust.

Hence, the covered return spring is free from the attachment of mud or dust and does not get rusty by rain water, thereby enabling smooth operation of the same for a long time resulting in proper braking action by the rotation of each cantilever.

The conventional cantilever brake uses a suspension wire, which is pulled to rotate the cantilevers for exerting the braking action, and each return spring is provided between the mounting base and the cantilever and acts against a pull of the suspension wire. Hence, when the suspension wire is unexpectedly cut, each cantilever is subjected to a restoring force of the return spring and rotates reversely to the direction of exerting the braking action, so that the free end of each cantilever at the suspension wire supporting side may enter between the spokes of bicycle wheel, whereby there has been a problem in that the spoke is broken or the bicycle falls down. This problem has been solved by providing a rotation restricting means between the cantilever C and the mounting base M as shown in the conventional example in FIG. 7 to thereby restrict the cantilever, and in turn a brake shoe, from rotating away from the wheel rim.

The lock pin P constituting the rotation restricting means, however, should be provided at the mounting base M as shown in FIG. 7. As a result, a problem has been created in that the mounting base M becomes complicated in construction, renders the existing mounting base unuseable, and leads to a high manufacturing cost.

On the contrary, this invention provides a separate independent cylindrical member, which bears no strength so it can be formed of synthetic resin, whereby a projection means, such as the lock pin, can be formed by use of the cylindrical member. As a result, the mounting base can be simple in construction and a conventional one can be used.

Also, the spring chamber for the return spring may be formed from a vacancy within the cantilever and the cylindrical member, thus miniaturizing the chamber and facilitating assembly of return spring therein. Also, the lever portion of cantilever is displaced toward the root of a shaft provided at the mounting base with respect to the boss so that chamber is formed simply by making use of the lever portion. The lever portion displaced toward the root of shaft at the mounting base can diminish distortion of the shaft when the brake is exerted, whereby the suspension wire has an improved transfer efficiency to that extent for the braking action and should improve the braking effect with respect to the wire stroke.

These and other objects of the invention will become more apparent in the detailed description and examples which follow.

DETAILED DESCRIPTION OF THE INVENTION

Figure 1:
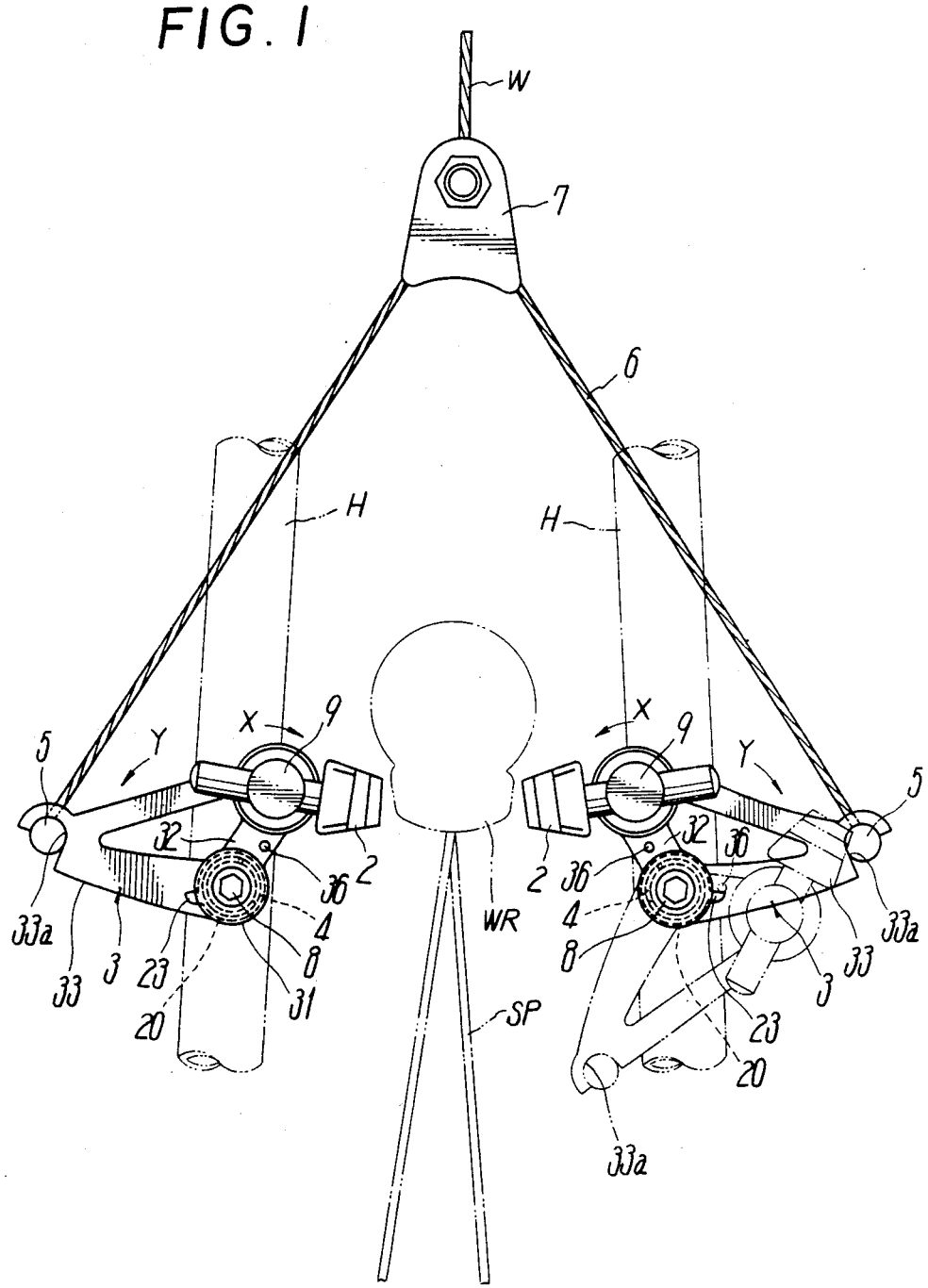
FIG. 1 is a front view of an embodiment of a brake of the invention.

Referring to FIG. 1, a cantilever brake is fixed to the front fork H of the bicycle and used for the front wheel thereof and is of fundamental construction such that a pair of cantilevers 3 having at one ends thereof brake shoes 2 are supported rotatably to shafts 11 at mounting bases 1 fixed to the fork H, coiled return springs 4 are interposed between the mounting bases 1 and the cantilevers 3, and a suspension wire 6 is mounted at both ends thereof to the free ends of cantilevers 3 through retainers 5 respectively. The suspension wire 6 connects at the center with a control wire W through a connector 7, so that the wire W is pulled to rotate the cantilevers 3 against the return springs 4 in the direction of the arrow X in FIG. 1, and when the braking action is released, the cantilevers 3 rotate by the restoring force of return springs 4 in the direction of the arrow Y in FIG. 1.

Next, explanation in detail will be given on the components in the above construction.

Figure 2:
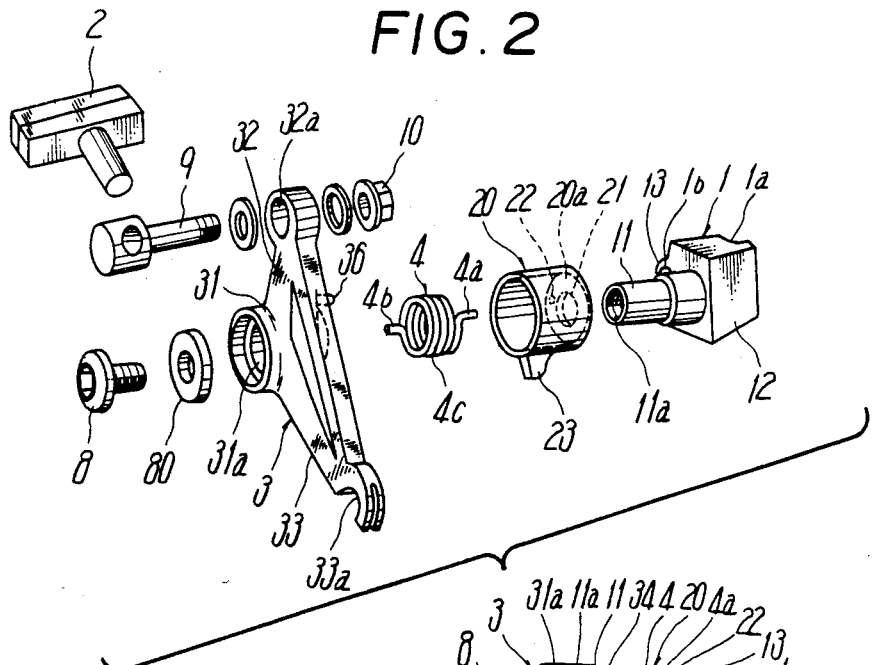
FIG. 2 is a perspective exploded view of the FIG. 1 embodiment.

The mounting bases 1, as shown in FIG. 2, each comprise a base block 12 having a mounting face 1a for the front fork H and the shaft 11 projecting from the base block 12 in the reverse direction to the mounting face 1a, the base block 12 providing a projection 13 having an engaging bore 1b, the shaft 11 providing at the center thereof a threaded bore 11a. Each mounting base 1 may be fixed to the fork H by welding or other screw means or band means.

The cantilevers 3 each comprise a bell crank provided at its boss 31 with lever portions 32 and 33 extending in the two directions as shown. Through-bores 31a and 32a are provided at the boss 31 and the utmost end of one lever portion 32 respectively and a hooked retaining portion 33a is provided at the utmost end of the other lever portion 33, so that a tightening screw 8 is inserted through the through-bore 31a and screws with the threaded bore 11a, thereby supporting the boss 31 rotatably onto the shaft 11. Through the through-bore 32a at the utmost end of lever portion 32 is inserted a tightening shaft 9, and a nut 10 is screwed with the end of shaft 9, thereby mounting the brake shoe 2 to the utmost end of lever portion 32. The retainers 5, as shown in FIG. 1, are retained to the retaining portions 33a at the lever portions 33 respectively and support both ends of suspension wire 6.

This invention houses the return springs 4 within spring chambers 35 respectively. Each spring chamber 35 is formed in such a manner that a cylindrical member 20, to cover the return spring 4, is formed separately from each mounting base 1 and cantilever 3, and fixed to, for example, the mounting base 1, and a fitting portion 34 is formed at the boss 31 of cantilever 3 and fitted into the cylindrical member 20.

The cylindrical member 20 is provided at its bottom 20a with a through bore 21 into which the shaft 11 is fitted, thereby being supported to the mounting base 1.

The spring 4 employs a coil spring having both ends 4a and 4b extending axially thereof. A through bore 22 coincident with the retaining bore 1b at the mounting base 1 is provided at the bottom 20a of cylindrical member 20, the one end 4a of spring 4 being retained into the bores 22 and 1b to thereby fix the cylindrical member 20 non-rotatably to the mounting base 1, and the other end 4b of spring 4 is retained into a retaining bore 3a provided at the boss 31 of cantilever 3.

Figure 3:
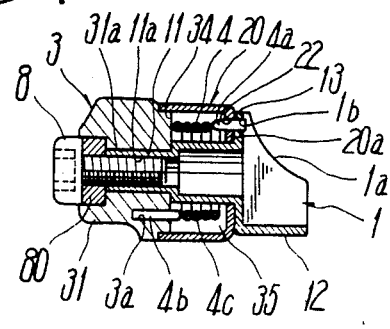
FIG. 3 is a longitudinal view of the principal portion of the same.

Each member constructed as described above is assembled on the mounting base 1 as shown in FIG. 3 and the tightening bolt 8 screws with the threaded bore 11a through a washer 80. In this assembly, the coiled portion 4c of spring 4 is housed within the sealed spring chamber 35.

Accordingly, the enclosed coiled portion 4c of spring 4 is reliably protected from being covered directly by mud or rain water, resulting in that the spring 4 avoids attachment of mud or dust or getting rusty, thereby being operable accurately for a long time.

In addition, it is preferable to fit the cylindrical member 20 onto the fitting portion 34 in close contact therewith, but a slight gap between both the members 20 and 34 is acceptable.

Alternatively, each cylindrical member 20 may provide a fitting portion to be fitted onto the outer periphery of the mounting base 1, thereby being fixed thereto through the fitting portion, in which the fixing means is not critical. Also, the cylindrical members 20 are fixed mainly to the mounting bases 1, but may be fixed to the cantilevers 3 respectively.

The embodiment in FIGS. 1 through 3 is provided, between the cylindrical members 20 and the cantilevers 3, with rotation restricting means for restricting the cantilevers 3 from rotating in the direction of the arrow Y in FIG. 1.

The rotation restricting means each comprise a stopper 23 provided, for example, at the outer periphery of cylindrical member 20 integrally therewith and an engaging projection 36 provided integrally at the cantilever 3, the projection 36 engaging with the stopper 23 to restrict the aforesaid rotation of cantilever 3. Alternatively, the stoppers 23 and engaging projections 36 may be separate from the cylindrical members 20 and cantilevers 3 and be welded or fixed by set screws.

In such construction, if the suspension wire is cut unexpectedly during the braking action by pulling the control wire W, the cantilevers 3 are intended to rotate by the restoring forces of return springs 4 in the directions of moving the brake shoes away from the wheel rim WR (in the direction) of the arrow Y in FIG. 1, so that the projections 36 at the cantilevers 3 abut against the stoppers 23 at the cylindrical members 20, thereby restraining the cantilevers 3 from further rotations respectively. Hence, the suspension wire supporting ends 33a of cantilevers 3 are reliably prevented from entering the path of the rotating wheel spokes SP at the bicycle.

Figure 5:
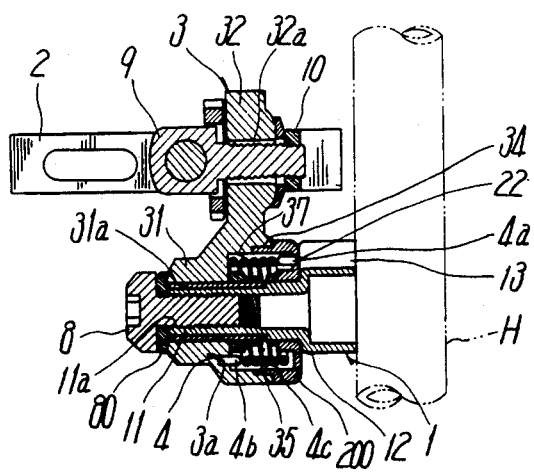
FIG. 5 is a sectional view of the principal portion of the FIG. 4 embodiment.

In the aforesaid embodiment, the spring chamber 35, as shown in FIG. 5, may alternatively be formed of a space 37 provided at the boss 31 of cantilever 3 and having a diameter larger than that of through bore 31a and equal to an inner diameter of a cylindrical member 200 and in continuation of the inner periphery thereof, and of an inner room in the cylindrical chamber 200.

Figure 4:
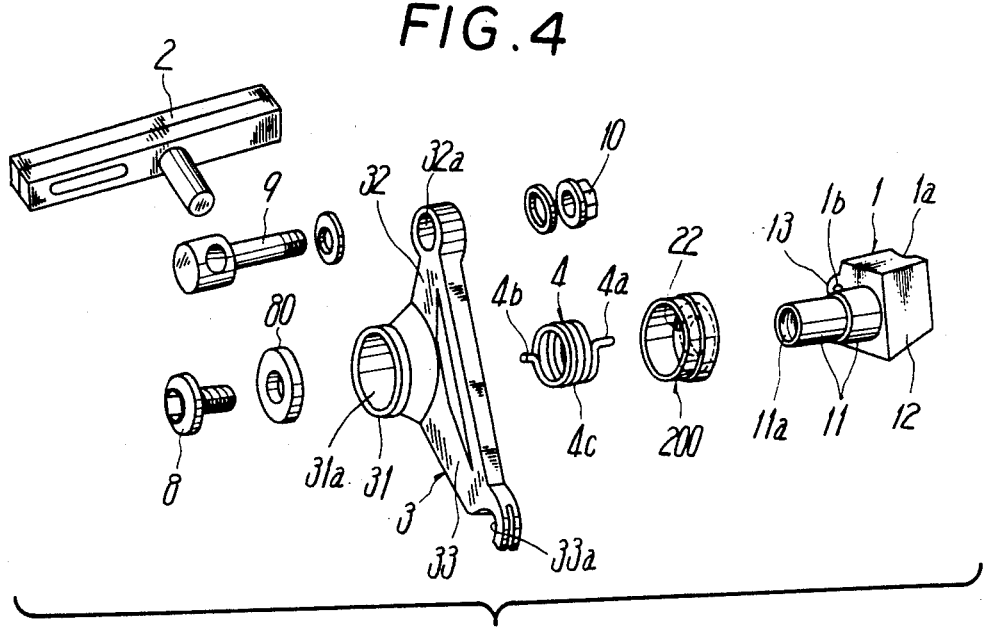
FIG. 4 is a perspective exploded view a modified embodiment of the invention.

In this case, the lever portions 32 and 33 of each cantilever 3 may extend from the outer periphery of boss 31, but are preferably shifted toward the root of shaft 11 at the mounting base 1 with respect to the boss 31 as shown in FIGS. 4 and 5.

Also, each space 37 is preferably provided at a common base end of levers portions 32 and 33 shifted with respect to the boss 31.

As seen from the above, since each cantilever 3 provides the space 37, the cylindrical member 200 can be small-sized and the return spring 4 be preassembled in the space, thereby improving its assembly.

Furthermore, the lever portion 32 shifted toward the root of shaft 11 can diminish distortion in the shaft 11 with respect to the seat block 12 when the brake shoe holding a portion of lever portion 32 is subjected to a load acting axially of the shaft 11 by the brake shoe 2. As a result, the braking effect is improved to that extent.

Figure 6:
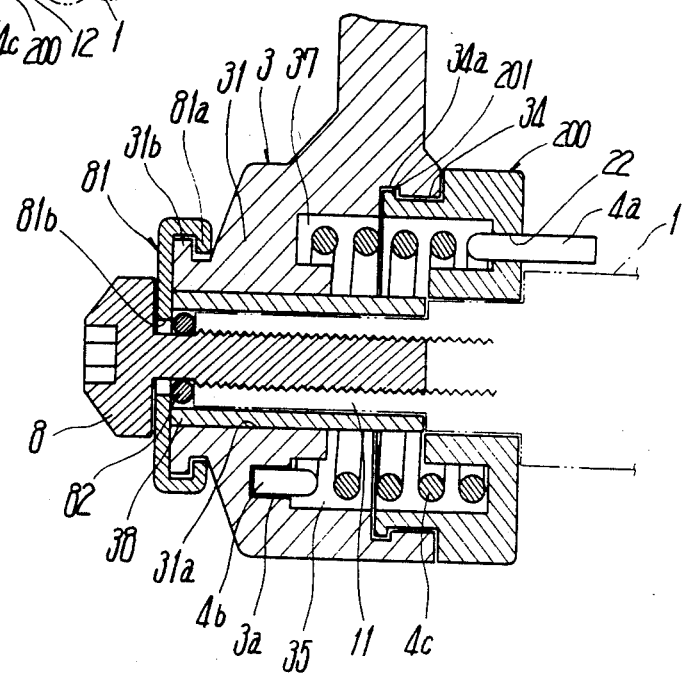
FIG. 6 is an enlarged sectional view exemplary of a modified construction for supporting a cantilever to a mounting base.
Figure 7:
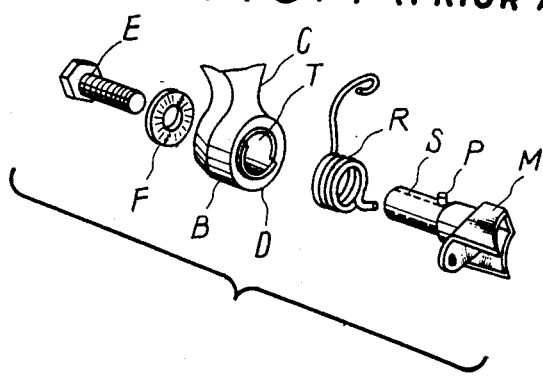
FIG. 7 is a perspective exploded view exemplary of a conventional cantilever omitted in part.

In addition, it is preferable that each cylindrical member 200, as shown in FIG. 6, is fitted at its one end into the fitting portion 34 at each cantilever 3 in a retaining manner not to escape therefrom.

In detail, in FIG. 6, the fitting portion 34 at the cantilever 3 and the cylindrical member 200 are provided with an annular groove 34a and an annular projection 201 respectively, the groove 34a and projection 201 being assembled in a retaining manner after insertion of spring 4 in the spring chamber 35. Furthermore, a flange 31b is provided at one end of boss 31, a washer 81 having an engaging portion 81a to engage with the flange 31b is fitted onto the end of boss 31, an O-ring 82 larger in diameter than a screw insertion bore 81b at the washer 81 is attached onto the screw 8 at the axial inside of washer 81, and a sleeve 38 is provided within the through bore 31a at the boss 31, these parts being assembled inseparably. This construction greatly improves workability and is effective in locking the screw 8 by means of O-ring 82.

In addition, in FIGS. 4 through 6, the parts coincident with those in FIGS. 1 through 3 are designated with the same reference numerals.

Also, the rotation restricting means in FIGS. 1 to 3 are not shown in FIGS. 4 to 6, which may of course be provided between the cylindrical members 200 and the cantilevers 3 in this embodiment, the same as in FIGS. 1 to 3.

Although several embodiments have been described, they are merely exemplary of the invention and not to be construed as limiting, the invention being defined solely by the appended claims.

What is claimed is:

1. A brake for a bicycle, comprising a pair of mounting bases each comprising a base member having an end face with a shaft projecting from said end face, a pair of cantilevers each having a boss and lever portions and supported rotatably to a said shaft at one of said mounting bases respectively, a pair of brake shoes fixed to said lever portions at said cantilevers respectively, a pair of return springs interposed between said mounting bases and said cantilevers respectively, a pair of cylindrical members covering said springs, said cylindrical members forming spring chambers housing said springs, each said return spring comprising a coil spring having at each end an extension extending axially with respect to said coil spring, each said cylindrical member having (i) a through bore receiving a said shaft of a corresponding one of said mounting bases and (ii) a bottom face which contacts a said end face of said corresponding one of said mounting bases, each said cylindrical member having a retaining bore at said bottom face for receiving one said extension of said coil spring and each mounting base having a retaining bore at said end face for receiving said one extension of said coil spring, said one extension of said coil spring passing through a said retaining bore of a said cylindrical member and being received in a said retaining bore of a corresponding said mounting base to thereby fix each cylindrical member to a corresponding said mounting base, the other said extension of each said coil spring being fixed to rotate with a respective said cantilever, and said brake further comprising rotation restricting means for restricting rotation of said cantilevers relative to said cylindrical members.

2. A brake for a bicycle according to claim 1, wherein said bosses at said cantilevers are provided with spaces in continuation of the inner peripheries of said cylindrical members respectively, said spaces together with inner vacancies of said cylindrical members forming said spring chambers respectively.

3. A brake for a bicycle according to claim 2, wherein said lever portions at each of said cantilevers are displaced toward the root of said shaft at each of said mounting bases and away from said boss.

4. A brake for a bicycle according to claim 3, wherein a space in continuation of each of said cylindrical members is formed at said lever portions of each of said cantilevers.

* * * * *